Aug. 5, 1958   G. R. O'BRIEN   2,846,129
FISHING ROD HOLDER
Filed March 28, 1956
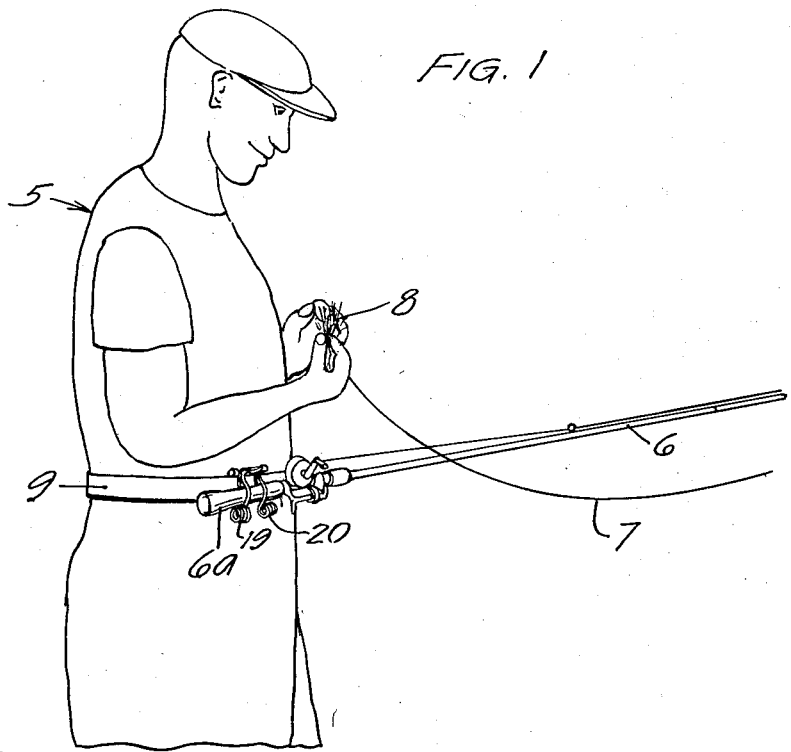
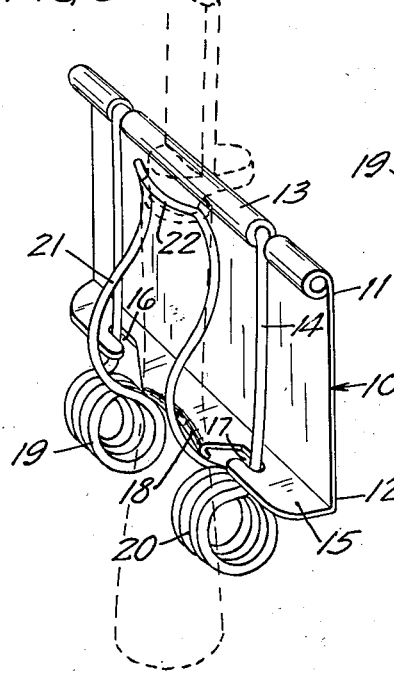
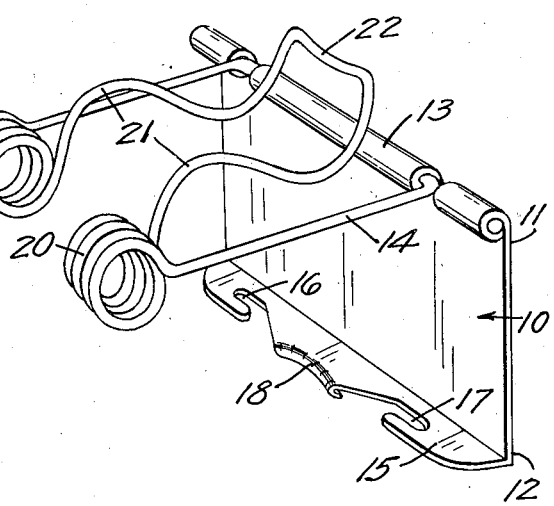
INVENTOR.
GEORGE R. O'BRIEN
BY
Williamson, Schroeder, Adams & Meyers
ATTORNEYS

United States Patent Office

2,846,129
Patented Aug. 5, 1958

2,846,129

FISHING ROD HOLDER

George R. O'Brien, Superior, Wis.

Application March 28, 1956, Serial No. 574,438

6 Claims. (Cl. 224—5)

This invention relates to fishing rod holders. More particularly it relates to a device designed to suspend a fish pole aloft from the belt of a fisherman in such a manner as to free his hands to permit maximum freedom in the use of his hands to connect or disconnect lures or adjust the same on the line.

In fly fishing and in other types of fishing wherein it is common for the fisherman to wade the body of water in which he is fishing, it is often necessary for the fisherman to change or adjust lures or make other changes to his tackle or to inspect his tackle while standing in midstream. In such instances, it is often very inconvenient for the fisherman to accomplish these activities for he has to utilize one hand to support the fishing pole while he attempts to adjust, inspect, or change his tackle with his sole remaining hand. My invention is designed to overcome this disadvantage.

It is a general object of my invention to provide a novel device for temporarily supporting a fishing rod from the medial portion of a fisherman's body to thereby free both his hands for adjustment to or changes in his fishing tackle.

Another object is to provide a novel and improved fishing rod holding device of simple and inexpensive construction.

Another object is to provide an unusually simple and inexpensive fishing rod holding device of unique construction and increased efficiency.

Another object is to provide a novel fishing rod holding device which will support solely a fishing rod in either a horizontal or vertical position from the waist of the fisherman.

Another object is to provide a novel fishing rod holding device wherein belt-engaging means will be incorporated with resilient clamping mechanism into a single simple device for positively securing a fishing rod in aloft position.

These and other objects and advantages of my invention will more fully appear from the following description made in connection with the accompanying drawings, wherein like reference characters refer to the same or similar parts throughout the several views, and in which:

Fig. 1 is a perspective view of a fisherman utilizing one embodiment of my invention.

Fig. 2 is a perspective view of the same embodiment shown in open position.

Fig. 3 is a perspective view of the same embodiment shown in locked belt-engaging and fishing rod-engaging position with the fishing rod extending vertically.

Fig. 1 illustrates one embodiment of my invention being worn by a fisherman indicated generally as 5 and supporting a fishing rod indicated generally as 6. As shown the fishing rod carries a fishing line 7 to which is connected a lure 8. The fisherman is shown inspecting the lure and a fishing rod 6 is shown being supported in a horizontally extending position from the waist of the fisherman. The embodiment shown is secured to the belt 9 of the fisherman in a manner to be hereinafter decribed.

As shown, one embodiment of my invention may consist of a metal plate 10 which has upper edge portions 11 and lower edge portions 12. The upper edge portions 11 are curved outwardly and then downwardly and then inwardly again to form a sleeve journal 13 which is adapted to receive therein a wire framework 14. As shown, this wire framework is substantially U-shaped and it is journaled within the sleeve 13 so as to pivot therewithin. The lower edge portions 12 of the plate 10 carry a laterally extending flange 15. This flange 15 extends outwardly away from the body of the fisherman when it is worn and has a pair of slots 16 and 17 formed therein. As shown best in Fig. 2, these slots were formed in the flange and extend outwardly toward the end portions of the plate member 10 and are spaced from each other longitudinally of the plate member. As also best shown in Fig. 2, the portion of the flange member 15 between the slots 16 and 17 has an inwardly extending recess 18 formed therein. This recess is curved and is adapted to receive thereagainst the handle of a fishing rod when the fishing rod is in vertical position, as best shown in Fig. 3.

The slots 16 and 17 are so spaced from each other as to adapt them to receive the outermost portions of the U-shaped wire framework 14. This wire framework is formed of resilient wire so that the legs of the U-shaped framework may be pressed toward each other so as to permit them to slip into the slots 16 and 17 and thus securely lock the belt 9 of the fisherman between the plate member 10 and the U-shaped framework 14. In this manner, the device is securely attached to the belt of the fisherman. It will be noted that the wire framework 14 which is pivotally mounted on the plate 10 forms with the plate 10 a belt-engaging means for securing the device to the belt of the fisherman.

As best shown in Figs. 2 and 3 the outer ends of the U-shaped framework 14 carry torsion springs 19 and 20 and these springs terminate at their inner ends in a clamp member indicated generally as 21. The clamp member 21 is of generally inverted U-shape and when looked at from the edge is generally S-shaped. It will be noted that the lower portion of the clamp member 21 curves outwardly and then inwardly again so that the upper portions thereof tend to bear against the plate member 10. The outwardly extending portions of the clamp member 14 are adapted to conform to the shape of the handle 6a of the fishing rod 6 when the fishing rod is in the horizontal position shown in Fig. 1. It will also be noted that the clamp member goes outwardly at the portions indicated by the numeral 22 at the upper end thereof to adapt the clamping mechanism to positively engage and conform to the shape of the handle 6a of the fishing rod 6 when the latter is inserted within the device in an upright or vertical position.

The torsion springs 19 and 20, together with the clamp member 21, form a clamping mechanism which cooperates with the plate member 10 to cooperatively hold the fishing rod 6 in the desired position as shown in Figs. 1 or 3. It will be readily appreciated through reference to Figs. 1 and 3 that, through the use of this simple and inexpensive holding device, it is now possible for the fisherman to utilize both his hands in making adjustments or changes to his fishing tackle without worrying about his fishing rod falling into the water and being lost or damaged. This device permits the fisherman to make full use of his hands without a great amount of inconvenience and exasperation which so often takes place while the fisherman is walking in midstream. This is especially true with novice fishermen.

To attach my holding device, the torsion springs 19 and 20 are pressed toward each other to thereby move the outer ends of the U-shaped member 14 toward each other and permit them to become disengaged from the slots 15 and 16. The plate member 10 is then inserted behind the belt 9 of the fisherman and the outer portions of the U-shaped member 14 are again snapped into place in the slots 15 and 16, thereby positively securing the belt between the U-shaped framework 14 and the plate member 10. The device can be worn in this manner without any inconvenience to the fisherman, and it is always instantly available for use in holding the fishing rod aloft during the fishing operation, if and when the same is desired. If the fisherman wishes to hold the pole in a horizontal position, he merely pulls outwardly upon the clamp member 21 and slips the handle downwardly between the U-shaped frame 14 and the clamping member 21. Upon releasing the clamping member 21, this member will solely support in cooperation with the plate 10 and the U-shaped member 14, the fishing rod 6 in the desired position.

If the fisherman wishes to hold the fishing rod 6 in a vertical position, he merely slides the handle element 6a into the fishing rod holding device a shown in Fig. 3 so that the handle lies within the recess 18 of the flange 15. The clamp member 21 will then bear against the handle 6a and hold the fishing rod 6 in a vertical position, the upper portion 22 of the clamp member conforming to the shape of the handle 6a.

Thus it can be seen that I have provided a simple and inexpensive fishing rod holding device which operates in a simple manner and is yet highly efficient. My fishing rod holding device greatly simplifies the problem of applying new lures or substituting other lures to the fishing line while in midstream and is a boon to fishermen who have not had a great deal of experience in this form.

It will, of course, be understood that various changes may be made in the form, details, arrangement and proportions of the various parts without departing from the scope of my invention.

What is claimed is:

1. A fishing rod holder comprising a plate member having opposed upper and lower edge portions, a wire framework mounted on said plate adjacent one of its said edge portions and extending along said plate toward the other of said edge portions in cooperative belt-engaging relation with said plate, said framework being constructed and arranged to receive and engage a belt worn by a fisherman between said plate member and wire framework, and resilient wire-framework clamping mechanism mounted on said first mentioned wire framework in cooperative fish pole-handle-engaging relationship with said plate member, said second mentioned framework being constructed and arranged relative to said plate member to cooperatively engage and support a fishing rod therebetween in an aloft position when the handle of the latter is placed therebetween to thereby free both hands of the fisherman for use thereof in securing lures and the like to a fish line.

2. The structure defined in claim 1, wherein said first mentioned framework is pivotally mounted on said plate adjacent one of its said edge portions, and means for holding said first mentioned framework in cooperative belt-engaging relation with said plate member.

3. The structure defined in claim 1 wherein said first mentioned framework is resilient in a direction transverse of its length, and latch means adjacent the edge portion of said plate member toward which said first mentioned framework extends, said latch means being constructed and arranged to engage and hold said first mentioned framework in belt-engaging relation with said plate member.

4. The structure defined in claim 1 wherein said plate has latch elements adjacent one of said edge portions and said wire framework is pivotally mounted adjacent the other of said edge portion and engages said latch elements to cooperatively secure said plate to a belt of a fisherman when the latter is placed therebetween.

5. A fishing rod holder comprising a plate member having opposed upper and lower edge portions, said plate having longitudinally spaced latch elements thereon adjacent said lower edge portions, a resilient wire framework pivotally mounted on said plate member adjacent its upper edge portion and extending downwardly therefrom and having separate wire elements extending into and releasably engaging said latch elements, said framework being readily swingable outwardly from said plate member when said wire elements are in non-engaging relation with said latch elements to permit the belt of a fisherman to be inserted and locked therebetween when said wire elements are returned to latch-engaging position, said wire elements extending downwardly beyond said latch elements and having the portions thereof extending therebeyond reversed upon themselves several times and then extending upwardly again and meeting to form a cooperating wire-framework clamp element extending in cooperative fishing pole handle-engaging relation with said downwardly extending wire elements for the cooperative engagement and support of a fishing rod in an aloft position when the handle of the latter is placed therebetween to thereby free both hands of the fisherman for use thereof in securing lures and the like to a fish line.

6. A fishing rod holder comprising a plate member having opposed upper and lower edge portions and having a flange extending laterally outwardly from said lower edge portion, a wire framework mounted on said plate adjacent its upper edge portion and extending along said plate toward said flange and engaging the same in cooperative belt-engaging relation with said plate to adapt the same to be secured to a belt worn by a fisherman, and resilient wire-framework clamping mechanism mounted on said first mentioned wire framework, said flange having a recess formed therein opposite said clamping mechanism and adapted to receive a fish pole handle therein, said clamping mechanism being in cooperative fish pole handle-engaging relationship with said plate member for the cooperative engagement and support of a fishing rod in a vertical position when the handle of the latter is placed therebetween and within said recess to thereby free both hands of the fisherman for use thereof in securing lures and the like to a fish line.

References Cited in the file of this patent

UNITED STATES PATENTS

| | | |
|---|---|---|
| 1,321,842 | Otto | Nov. 18, 1919 |
| 2,456,129 | Krogh | Dec. 14, 1948 |
| 2,524,617 | Wyse | Oct. 3, 1950 |
| 2,576,624 | Miller | Nov. 27, 1951 |
| 2,592,688 | Halfpap et al. | Apr. 15, 1952 |
| 2,742,210 | Bortz et al. | Apr. 17, 1956 |